Oct. 24, 1967      D. A. WILLIAMS      3,348,331
LIVE ANIMAL TRAP
Filed July 16, 1965
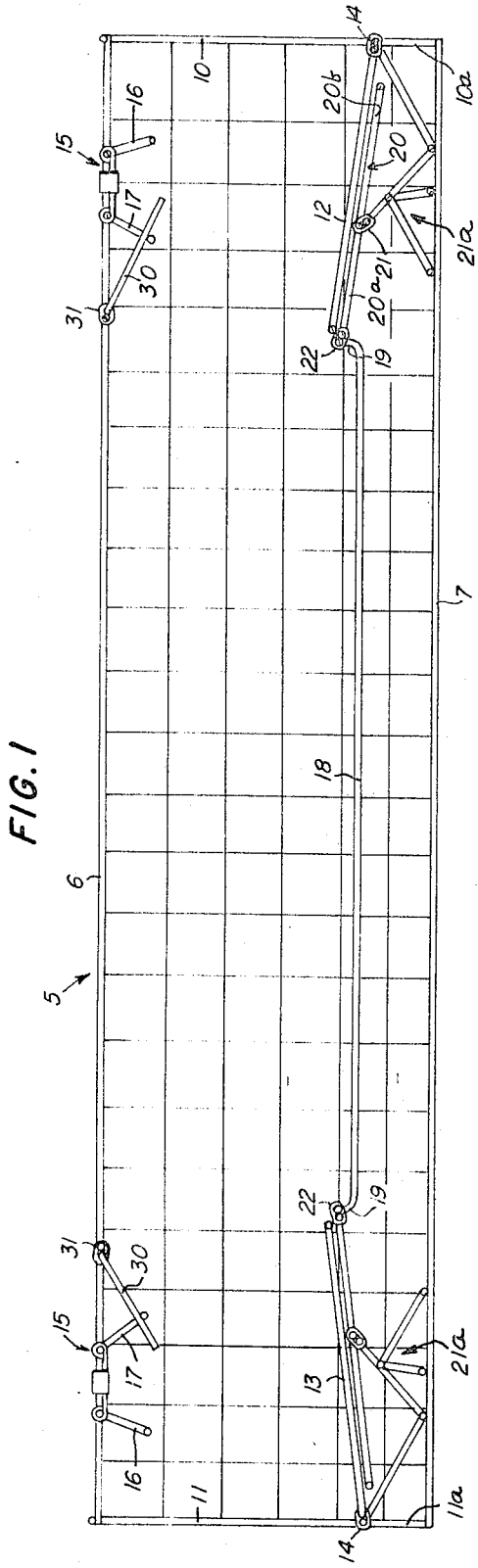
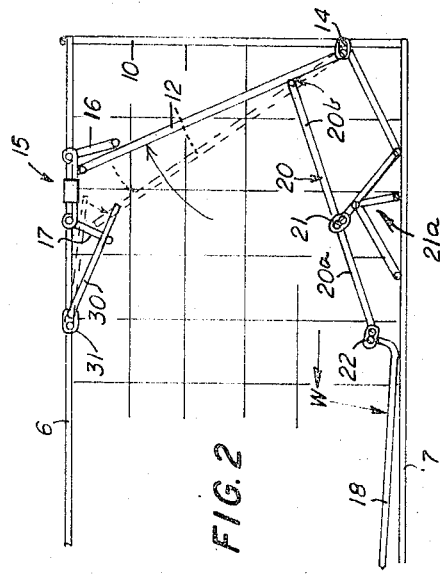
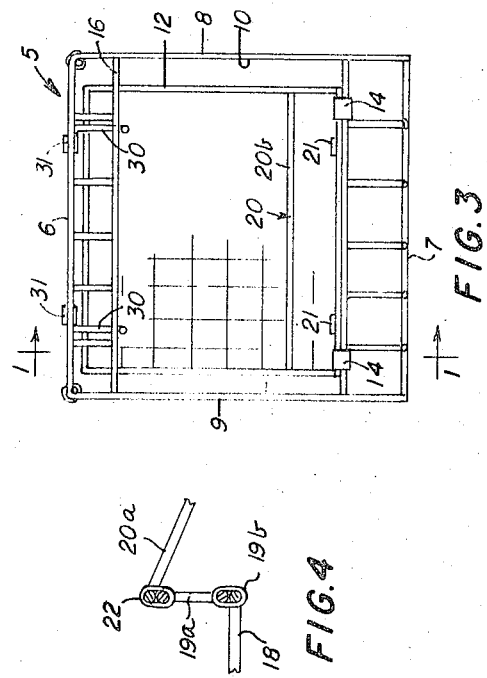
INVENTOR
DREW A. WILLIAMS
BY
ATTORNEY

United States Patent Office 3,348,331
Patented Oct. 24, 1967

3,348,331
LIVE ANIMAL TRAP
Drew A. Williams, P.O. Box 66, Kennett, Mo. 63857
Filed July 16, 1965, Ser. No. 472,431
8 Claims. (Cl. 43—61)

This invention relates to animal traps and consists more particularly in new and useful improvements in a live animal trap comprising an elongated cage or enclosure having normally open access openings at one or both of its extremities, adapted to be closed by barriers which are actuated and maintained in closed positions solely by the weight of an animal which has entered the enclosure.

An object of the invention is to provide an animal trap which does not require springs, latches, or complicated linkages to effect the closure of its access openings.

Another object of the invention is to provide an animal trap having a floating false bottom suspended from a leverage system, which is designed to automatically close the access opening or openings immediately upon being subjected to the weight of an animal after entering the enclosure.

A further object of the invention is to provide an animal trap of this nature, wherein the entire false bottom serves as a treadle which actuates the access opening barrier or barriers, once an animal has passed the balance point of a supporting leverage system, and wherein the barriers are locked in closed position by the weight of the animal on the false bottom.

A still further object of the invention is to provide an animal trap which can be selectively constructed to catch animals of different types, sizes and weights. Since the trap is activated by the animal's weight, it can be so constructed as to catch a mink or other animal of a comparable weight group, while permitting a smaller animal, such as a mouse, to pass through the trap without springing it and thus rendering it ineffective until re-set.

Still another object of the invention is to provide an animal trap which cannot be accidentally sprung from the exterior, and wherein wind, rain or other foul weather or the dropping of a branch from a tree will not cause the trap to prematurely spring.

In many enclosure-type traps, a fast running animal is able to pass completely through the enclosure before the barriers are sprung. It is, therefore, a further object of this invention to provide an animal trap wherein animals traveling at high speeds at the time of entering the trap actually close the far door or barrier in front of them first, thus making the trap equally as effective in trapping running animals as in trapping slow-moving animals.

Another object of the invention is to provide an animal trap which is simple in construction, easy to set, and one which in no way injures a trapped animal.

With the above and other objects in view which will appear as the description proceeds, the invention consists in novel features herein set forth, illustrated in the accompanying drawings, and more particularly pointed out in the appended claims.

Referring to the drawings in which numerals of like character designate similar parts throughout the several views:

FIG. 1 is a view of the trap in side elevation, and to facilitate a clear understanding of the principle of operation, the working parts of the device are shown in heavy lines and the mesh of the enclosure walls are shown more or less in phantom;

FIG. 2 is a generally similar view of one end of the trap with the barrier in closed position; and FIG. 3 is an end view of the trap with the barrier in the position shown in FIG. 2; and FIG. 4 is a detail of a modified false bottom hinge.

In the drawings, referring first to FIG. 1, the cage or enclosure is generally indicated by the numeral 5, and comprises an elongated, rectangular structure having horizontal top and bottom walls 6 and 7 and vertical side walls 8 and 9, preferably formed of rigid wire mesh, suitably fabricated in tubular form. The opposite ends of the enclosure 5 are normally open as at 10 and 11, save for relatively shallow vertical panels 10a and 11a, bounding the lower extremities of the respective access openings 10 and 11.

Barriers 12 and 13, also preferably formed of wire mesh panels, are hingedly connected along their lower edges to the adjacent upper edges of the respective end panels 10a and 11a by any suitable hinge means 14. These hinged barriers are rectangular in shape and of dimensions to swing vertically in an arc within the confines of the enclosure side walls, from open position as shown in FIG. 1, to closed position as shown in FIG. 2. The height of the barriers, as best seen in FIG. 2, is such that when barrier 12, for example, is in closed position, it is diagonally inwardly disposed between the pivots 14 and the top wall 6 of the enclosure. Preferably, a mesh guard device, generally indicated by the numeral 15, is secured to the top wall 6 of the enclosure in inwardly spaced relation to each of the access openings 10 and 11. These guards comprise transversely extending, angularly disposed mesh panels 16 and 17 which depend into the enclosure and are laterally spaced from one another a distance to accommodate the arcuate swinging movement of the upper end of the corresponding barrier 12, 13. The guards are designed to prevent an entrapped animal from gaining access to the upper edge of a closed barrier and working it into open position. As will be seen in FIG. 2, the upper edge of the barrier 12 swings inwardly and downwardly with a relatively small clearance between its top edge and the lower extremity of the guard panel 17, so that an animal's paw would be unable to pull the barrier downwardly from the interior of the trap. The opposite guard panel 16 serves as an additional abutment when the barrier is in closed position.

A false bottom 18, preferably consisting of a rigid wire mesh panel, is suspended at its opposite, upturned, longitudinal extremities 19, from supporting leverage systems hereinafter described, so that the false bottom actually floats in vertically spaced relation to the bottom wall 7 of the enclosure 5. The length of the false bottom is preferably substantially equal to the distance between the upper edges of the two barriers 12 and 13 when the latter are in open position, as shown in FIG. 1, so that the barriers serve as access ramps to the false bottom.

Each of the leverage systems above referred to comprises a wire mesh lever panel, generally indicated by the numeral 20, of substantially the dimensions of the respective barriers 12 and 13, being pivotally connected as at 21 to a fulcrum supporting framework 21a. The fulcrum 21 is located intermediate the longitudinal extremities of the respective lever panels, on axes parallel with the respective axes of the barrier pivots 14. The inner ends of the panels 20 are pivotally connected as at 22 to the respective upturned ends 19 of the false bottom 18. The fulcrum point 21 of each lever panel is selectively positioned with respect to the centers of the panels, to provide the proper leverage for overcoming the weight of the hinged barrier 12 when the operating weight W of the animal is applied to the false bottom 18. By varing the position of this fulcrum, the trap can be especially adapted for the particular type and weight of the animal sought to be trapped. Although not shown on the drawing, the fulcrum point 21 may be made adjustable with respect to the lever panel 20 for this purpose.

Inasmuch as both of the leverage systems operate identically, a description of the operation of one will suffice. The barrier 12, for example, is normally swung inwardly and overlies the leverage panel 20, as seen in FIG. 1. Their arrangement is such that both the barrier 12 and the leverage panel 20 lie in upwardly and inwardly inclined positions within the enclosure 5 so that the barrier serves as a ramp from the access opening 10 to the false bottom 18, the latter being supported in its extreme upper position by the hinge connections 22 at the adjacent edges of the respective lever panels 20. The weight of the barrier 12 on the lever panel 20 retains the false bottom 18 in this elevated position until overcome or over-balanced by the weight of an animal upon the false bottom. As soon as an animal enters the enclosure 5 and its weight is applied to the false bottom 18, as at W in FIG. 2, the arm 20a of the leverage panel 20 is pressed downwardly, causing the lever panel to rock on its fulcrum 21 so that the opposite arm 20b engages beneath the overlying barrier 12, causing it to swing upwardly on its pivots 14 into the closed position shown in FIG. 2. The barrier is maintained in this position so long as the animal's weight is applied to the false bottom 18.

As before stated, the opposite barrier 13 and its leverage system operate in the same manner as that just described. However, it may be pointed out that the barrier 13 at the far end of the enclosure does not actually close until the animal has passed the balance point on the false bottom, which operates the far leverage panel. In this connection, it may be noted that a fast moving animal, upon entering the trap, would, in all probability, jump a distance to overshoot the balance point, and, in this event, the far barrier 13 would immediately close in front of him, prior to the closure of the barrier 12 over which the animal entered.

In order to re-set the trap, all that is required is to press downwardly on the long arms 20b of the lever panels 20, which thereby releases the barriers 12 and 13 from the closed position shown in FIG. 2, and permits them to return into overlying relationship with the respective leverage panels.

While the trap of the present invention has been shown and described as being formed of heavy wire mesh, it is to be understood that the walls of the enclosure may be formed of solid panels. The same is true with respect to the barriers, leverage panels and false bottom.

Also, while the invention is illustrated with access openings at both extremities of the enclosure, the trap can be constructed in a form wherein one end of the enclosure is permanently closed, the opposite end being provided with an access opening and barrier construction, such as above described. In this event, of course, one end of the false bottom would be pivotally connected to the leverage panel, while its opposite end would be pivotally supported in any suitable manner.

Although not essential to the basic operation of the trap, a safety catch may be provided to prevent the opening of the barrier by an animal either inside or outside of the trap. This safety catch comprises a substantially U-shaped wire, hingedly connected to the top wall of the enclosure, as at 31, providing two inwardly projecting spaced arms 30 which normally rest on the bottom crosswire of the guard panel 17 in an inclined position above the barrier 12. As best seen in FIG. 2, when the barrier 12 swings upwardly upon its hinge, its upper extremity engages beneath the latch arms 30, swinging the arms upwardly on the hinge 31 until the barrier has cleared their free ends, as shown in full lines. Thereupon, the latch arms 30 are permitted to drop back onto the crosswire of the guard panel 17, and should sufficient force be applied to the barrier 12 toward the open position, the upper extremity of the barrier would engage the upper sides of the latch arms 30 and prevent the opening of the barrier. In order to open the barrier, it is simply necessary to swing the arms 30 upwardly so that the barrier clears their free ends.

As previously noted, it is highly important that the length of the false-bottom 18 be correct, as its relationship to the points of connection to the barriers is critical. Therefore, to provide a false bottom which will automatically assume the proper relationship to the barriers supporting it, a modified hinge structure, such as shown in FIG. 4, may be employed. Here, it will be seen that instead of providing upturned ends 19 on the barrier, a separate supporting link 19a may be employed. Opposite ends of this link are respectively hinged at 19b to the end of the false bottom, and at 22 to the arm 20a of the barrier. Thus, the false bottom can adjust itself with respect to the barriers so as to insure the proper relationship at the hinged ends.

It will be apparent that the present invention provides a very simple and effective live animal trap which is not dependent upon complicated latches, rods, springs and linkage systems, which not only tend to become out of shape by rough handling, but are often very complicated to set. Furthermore, by hinging the barriers along their lower edges so that they close upwardly, they serve as combined entering ramps and barriers which immediately close when the false bottom is subjected to the animal's weight, and they are locked in closed position so long as the animal's weight is applied to the false bottom.

From the foregoing, it is believed that the invention may be readily understood by those skilled in the art without further description, it being borne in mind that numerous changes may be made in the details disclosed without departing from the spirit of the invention as set forth in the following claims.

I claim:

1. A live animal trap comprising an enclosure having an access opening at at least one longitudinal extremity, a vertically floating false bottom within said enclosure, the end of said false bottom adjacent said access opening being hinged to one arm of an actuating lever which is fulcrumed intermediate its ends on an axis substantially parallel with that of the false bottom hinge, a barrier for said access opening, said barrier being hinged at its lower edge within said enclosure on an axis substantially parallel to that of the actuating lever fulcrum and normally overlying the opposite arm of said lever when in open position, whereby, when said false bottom is subjected to the weight of an animal entering said enclosure through said access opening, said lever is rocked on its fulcrum, causing the arm of said lever underlying said barrier, to swing the latter upwardly and close said access opening.

2. A live animal trap comprising an enclosure having an access opening at at least one longitudinal extremity, a normally open barrier for said access opening horizontally hinged at its lower edge within said enclosure, a vertically floating false bottom within said enclosure, an actuating lever fulcrumed intermediate its ends adjacent one extremity of said false bottom, means hingedly connecting one arm of said lever to the adjacent extremity of said false bottom, and the opposite arm of said lever underlying said open barrier, whereby, when said false bottom is subjected to the weight of an animal entering said enclosure through said access opening, said lever is rocked on its fulcrum, causing the arm of said lever underlying said barrier, to swing the latter upwardly and close said access opening.

3. A live animal trap comprising an enclosure having access openings at opposite longitudinal extremities, normally open barriers for said access openings, respectively hinged at their lower edges for swinging movement from inwardly reclining open positions to substantially vertical closed positions with respect to said openings, actuating levers fulcrumed intermediate their ends adjacent each of said barriers, at least one arm of each lever adapted to underlie respective barriers when the latter are in reclining open positions, and a vertically floating false bottom having its longitudinal extremities hingedly suspended from the respective opposite arms of said levers, whereby, when said false bottom is subjected to the weight of an animal entering said enclosure through either access opening, the corresponding lever is rocked on its fulcrum, causing the arm of said lever underlying said barrier to swing upwardly to close said access opening.

4. A live animal trap as claimed in claim 3, wherein said enclosure is of mesh construction.

5. A live animal trap as claimed in claim 3, wherein said enclosure and said barriers are of mesh construction.

6. A live animal trap as claimed in claim 5, wherein said actuating levers comprise rigid mesh panels.

7. A live animal trap comprising an enclosure having an access opening at at least one longitudinal extremity, a vertically floating false bottom within said enclosure, the end of said false bottom adjacent said access opening being hinged to one arm of an actuating lever which is fulcrumed intermediate its ends on an axis substantially parallel with that of the false bottom hinge, a combined access ramp and barrier hingedly connected at its lower edge within said enclosure, adjacent said access opening, said combined ramp and barrier normally overlying the arm of said lever opposite to that which is hinged to said false bottom, when in open position, whereby, an animal may enter said enclosure on said access ramp and barrier, and when said false bottom is subjected to the weight of said animal, said lever is rocked on its fulcrum, causing the arm of said lever underlying said combined ramp and barrier to swing the latter upwardly and close said access opening.

8. An animal trap as claimed in claim 3, including latch means for retaining said barriers in closed position.

References Cited

UNITED STATES PATENTS

| 882,373 | 3/1908 | Carter | 43—67 |
| 1,601,848 | 10/1926 | Carmack | 43—76 |
| 1,659,063 | 2/1928 | Wallace | 43—61 |
| 1,721,653 | 7/1929 | Winkler | 43—76 |
| 1,862,038 | 6/1932 | Session | 43—67 |

SAMUEL KOREN, *Primary Examiner.*

W. H. CAMP, *Assistant Examiner.*